No. 621,141. Patented Mar. 14, 1899.
A. C. RICE.
WATER WHEEL SYSTEM.
(Application filed May 9, 1898.)
(No Model.) 4 Sheets—Sheet 1.
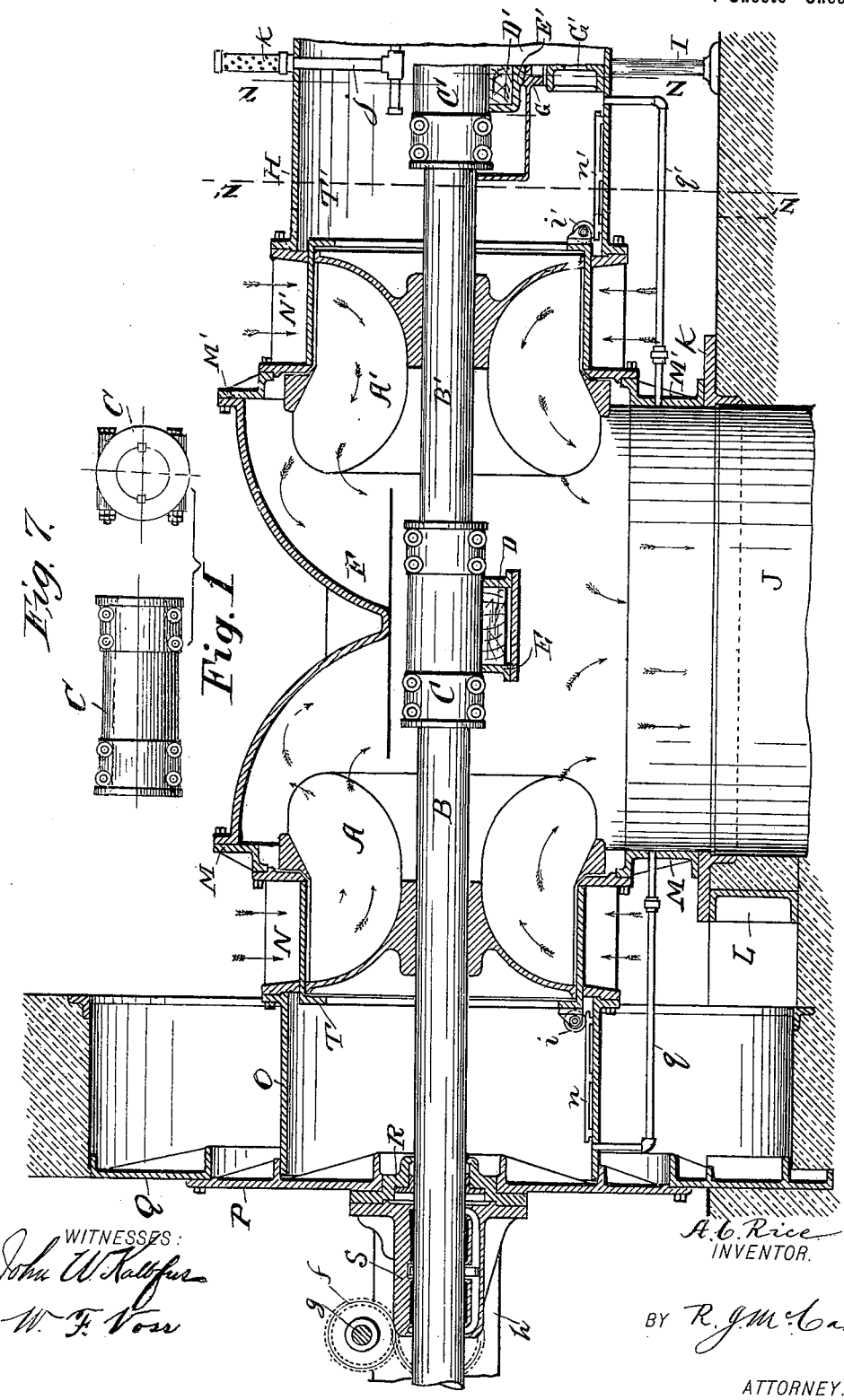
WITNESSES:
John W. Kaltfus
W. F. Voss
A. C. Rice
INVENTOR.
BY R. J. McCarty.
ATTORNEY.

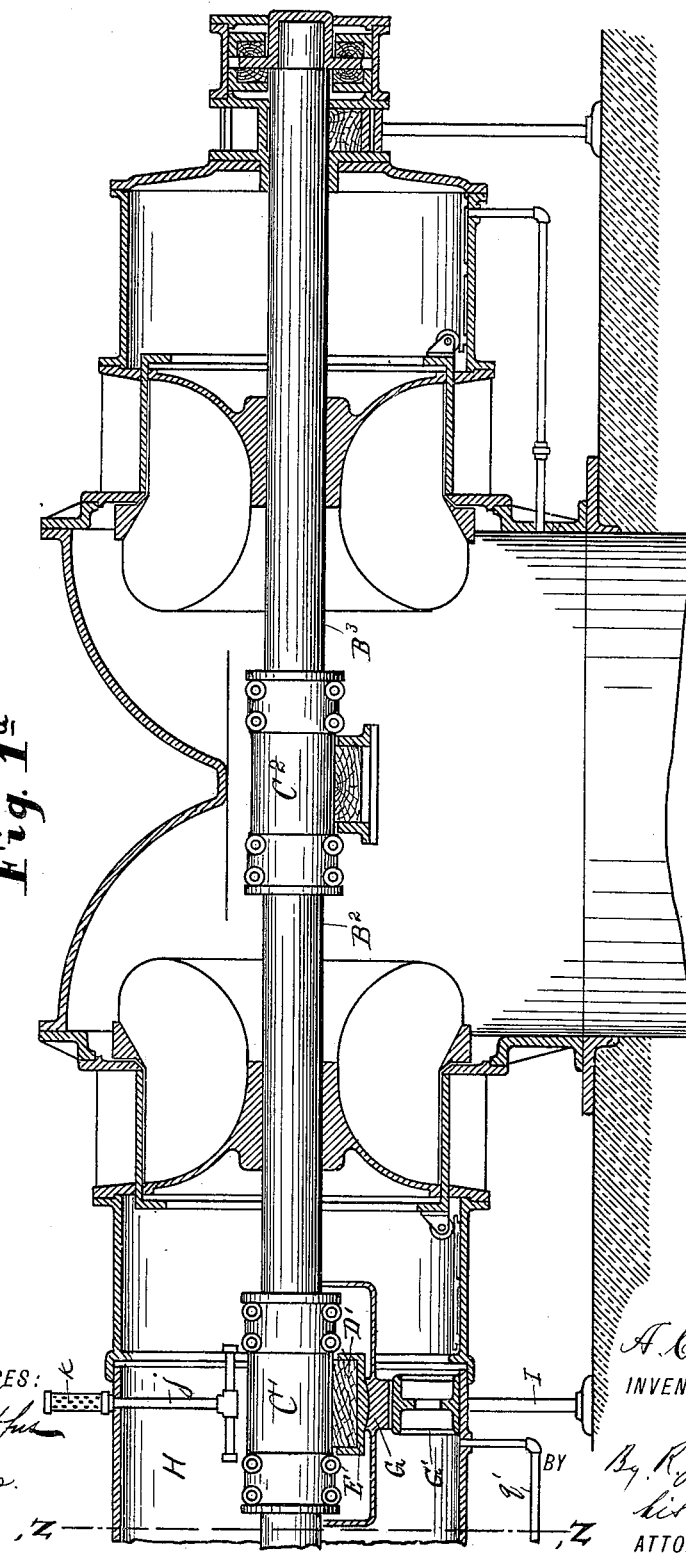

No. 621,141. Patented Mar. 14, 1899.
A. C. RICE.
WATER WHEEL SYSTEM.
(Application filed May 9, 1898.)
(No Model.) 4 Sheets—Sheet 3.
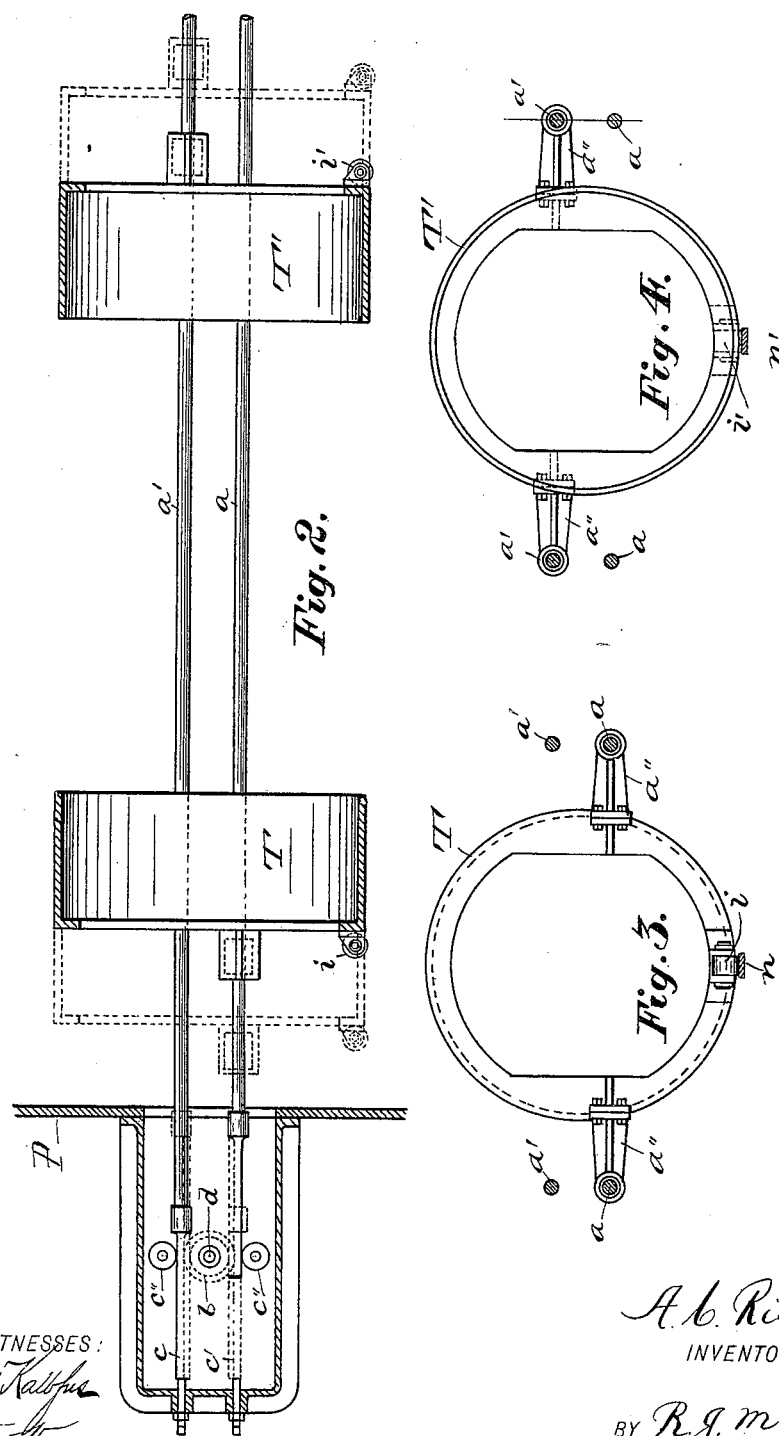

No. 621,141. Patented Mar. 14, 1899.
A. C. RICE.
WATER WHEEL SYSTEM.
(Application filed May 9, 1898.)
(No Model.) 4 Sheets—Sheet 4.

WITNESSES:
INVENTOR
A. C. Rice.
BY
ATTORNEY.

THE NORRIS PETERS CO., PHOTO-LITHO., WASHINGTON, D. C.

UNITED STATES PATENT OFFICE.

ALVA C. RICE, OF DAYTON, OHIO.

WATER-WHEEL SYSTEM.

SPECIFICATION forming part of Letters Patent No. 621,141, dated March 14, 1899.

Application filed May 9, 1898. Serial No. 680,155. (No model.)

*To all whom it may concern:*

Be it known that I, ALVA C. RICE, a citizen of the United States, residing at Dayton, in the county of Montgomery and State of Ohio, have invented certain new and useful Improvements in Water-Wheel Systems; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to water-wheel systems, and has special reference to that class of turbine wheels in which one or more wheels may be mounted on a horizontal shaft and arranged to discharge into one or more draft-tubes.

The leading objects of the invention are, first, to so unite and group the various parts comprising a water-wheel system that the space required for setting two or more wheels is reduced to a minimum; secondly, to locate the gate-operating mechanism on the outside of the flume-head cover in order that the working parts may be free from contact with water and easily accessible for repairs; thirdly, to mount the draft-chamber, chute-cases, and dome-cylinders in a manner that insures a perfect alinement of the several parts constituting the wheel-casing, and, fourthly, to provide a combined bearing and shaft-coupling by means of which two or more shafts may be joined, and in addition thereto the said coupling constituting a water-bearing in which the frictional pressure per square inch is greatly reduced as compared with other bearings for like purposes.

Preceding a detailed description reference is made to the annexed drawings, of which—

Figure 5:
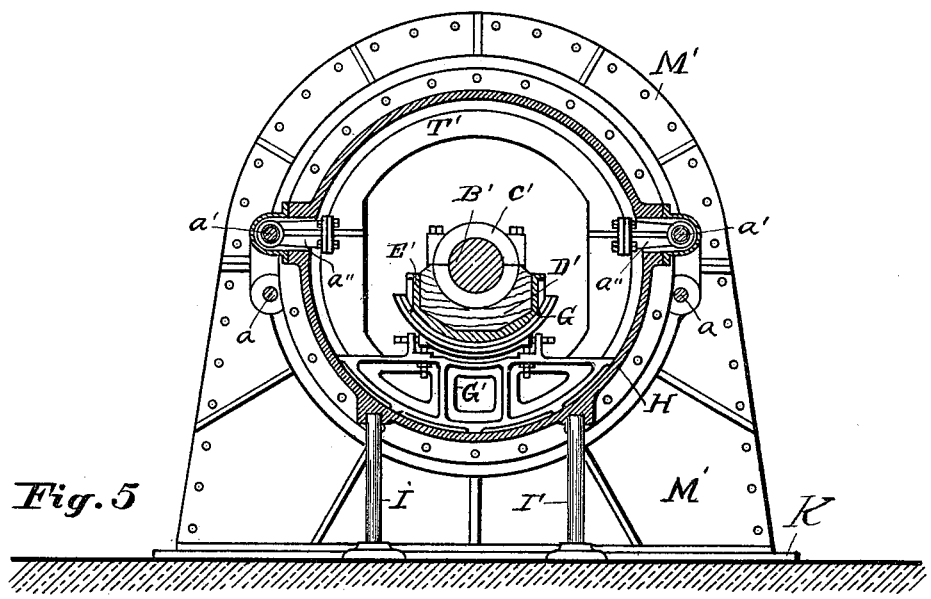
Figure 6:
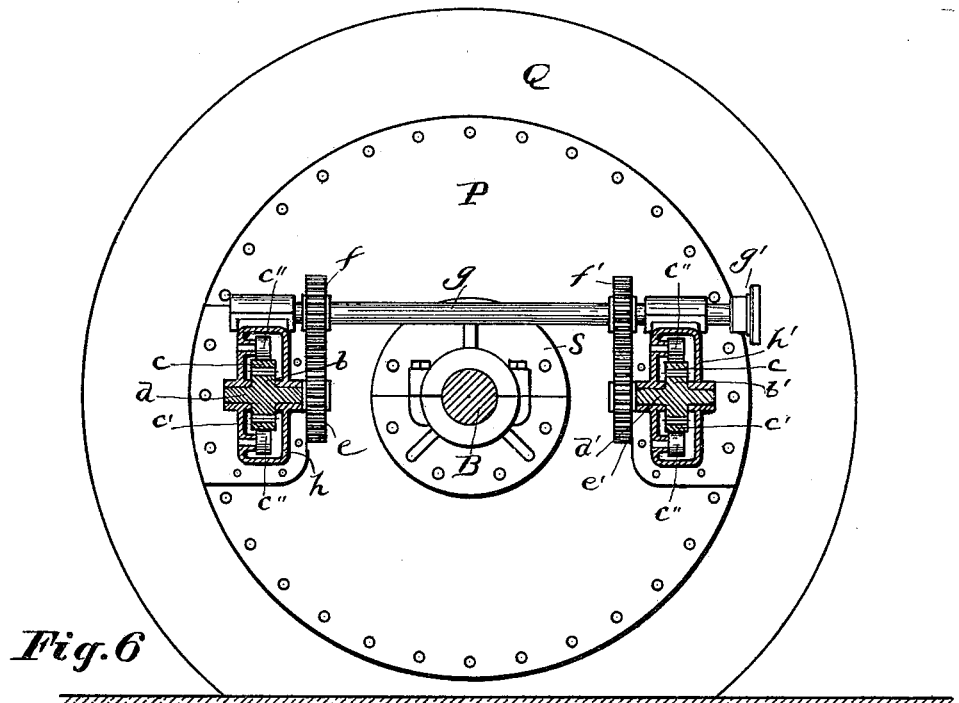

Figure 1 is a central vertical longitudinal section of a water-wheel system in accordance with my invention. This view is continued from the line Z' Z' on Sheet 2. Fig. 1ª is a similar sectional view showing a continuation of Fig. 1 from the point indicated by the line Z' Z' of the latter figure. Both views combined illustrate a complete system comprising two pairs of turbine wheels. Fig. 2 is a longitudinal section of the gate mechanism. Figs. 3 and 4 are detached elevations of the gates, the actuating-rods thereof appearing in section. Fig. 5 is a cross-section on the line Z Z of Fig. 1. Fig. 6 is a front elevation of the flume-head and cover, showing the gate-operating mechanism on the latter; and Fig. 7, side and end views, respectively, of the two-part sleeve or shaft coupling.

In the following specification similar reference characters will indicate similar parts in the several views of the drawings.

The turbine wheels A and A' are mounted horizontally on shafting, consisting of two sections B and B', which are connected by sleeve or coupling C. This sleeve-coupling consists of two halves, which are united at their ends by bolts. The adjoining ends of the shafting are keyed to said sleeve, as shown in Fig. 7, and in addition to forming a coupling for uniting two or more shafts the said sleeve forms a water-bearing between the wheels, by which the frictional pressure is greatly reduced. One or more additional wheels may be grouped with those shown in Fig. 1 by coupling one or more shafts $B^2$ $B^3$ by means of additional coupling-sleeve $C^2$, as shown in Fig. 1ª. In thus multiplying the wheels the same idea of means shown in Fig. 1 is carried out. The bearings D D' are inclosed in casings E E', the former of which is bolted to the draft-chamber casing F and the latter of which is secured to an adjustable shoe G, supported on a saddle G', the latter being bolted to the dome-cylinder H, supported on posts I I'. The draft-tube J is bolted to the draft-tube ring K, which in turn is bolted to a tie-plate L.

M M' designate rings that are bolted to the draft-chamber F and receive the chute-cases N N', which are bolted thereto and which are also bolted, respectively, to the dome-cylinders H and O. The last-named cylinder is bolted to the flume-head cover P, which is likewise secured to the flume-head Q, which is set in a wall of masonry. The system is especially designed for an open masonry flume. Therefore the flume, with the exception of the head wall, is omitted from the drawings. It will thus be seen that the dome-cylinder O is wholly within the wall, and it is apparent that by so placing it less space is needed for setting the wheels, the amount of space so economized being equal to the horizontal width of the said wall. This is an important feature, as will be more clearly shown hereinafter. There is bolted to the flume-head cover P a packing-box R, which is provided with suitable packing-gland, secured to the outer surface of which is a ring oiling-bearing S, made in halves. The draft-chamber casing F being rigidly supported by the draft-tube ring K and having secured to it the chute-cases N N', which are bolted to the dome-cylinders H and O, as hereinbefore described, the several parts are kept in perfect alinement. These parts, united and projected into the flume-head in the compact manner shown, enable, as before stated, a great economizing of space necessary for setting the wheels. The shaft takes none of the weight of the wheel-casing and is free from all weight except that which is due to the action of the water on the wheels. In order to keep the dome-cylinders H O free from water and prevent water from coming in contact with the oil-bearings, I provide drain-pipes $q\,q'$, tapped into said cylinders and discharging into the draft-tube J, the suction created by the discharge-water from the wheels tending to draw the water out of the said cylinders. The sleeve coupling and journal C is lubricated by the discharge of water from the wheels, and journal C' is likewise lubricated by water-piping $c$, which is provided with a strainer $k$. The several bearings S, C, and C', owing to their construction and location, insure a perfect alinement of the wheel-shafting with the chute-cases. The gates T T' are operated by parallel gate-rods $a\,a'$, the former of which actuates the gate T and the latter rod operating in connection with gate T'. These rods are secured to their respective gates by means of arms $a''$, that project laterally from opposite sides of the gates and are operated to shift the gates in opposite directions, as shown in Fig. 2, by spur-pinions $b\,b'$, that engage with racks $c\,c'$ on the ends of said rods. The outer sides of the racks engage with guide-rollers $c''$. On shafts $d\,d'$ of the pinions $b\,b'$ there are also mounted spur-gears $e\,e'$, that engage with similar gears $f\,f'$, secured to a transverse shaft $g$, the latter being journaled on housings $h\,h'$, bolted to the flume-head cover P. The housings $h\,h'$ also receive the journals for shafts $d\,d'$ and rollers $c''$. $i\,i'$ designate rollers mounted on the gates and resting on tracks $n\,n'$, secured to the cylinders H O. These rollers take the weight of the gates, and thereby relieve the gate-operating rods of the strain due from said weight. The movement is imparted to the rods by turning the transverse shaft $g$ by hand-wheel $g'$ or in any manner. The pinions $b\,b'$, engaging with the racks of said rods on each side of the gates, will when moved actuate the said rods in opposite directions to simultaneously move the gates. By thus locating the gate-operating mechanism on the outside of the flume-head cover the working parts are free from contact with water, are easily adjusted, operated, and lubricated, and all the mechanism can be taken off and repaired without drawing the water from the flume.

Modern engineering, especially in the driving of electric generators and other rapid-running machinery, imposes new and very difficult conditions upon the designers and builders of water-wheels. In the case of electric generators, for example, these require a large power and a high speed. In view of these requirements a direct connection to the turbine-shaft is preferred wherever it is possible to have it, because such direct connection avoids all possible loss of power through transmission appliances. These conditions frequently necessitate the grouping of several turbine wheels in order to form what is known as a "unit" of power suited for the purpose in hand. To illustrate: Suppose the electric generator requires one-thousand-horse power and a speed of three hundred revolutions per minute. Now with forty feet head these results could be obtained with a pair of thirty-inch wheels of the type shown. But suppose the same requirements of power and speed are required with a head of only thirty feet. This would call for two pairs of twenty-seven-inch wheels. Or, again, if the head was only twenty-five feet, to obtain the requisite power and speed under that head would necessitate three pairs and one single wheel of the twenty-four-inch type, all connected on one horizontal shaft and forming a unit. The construction shown in the drawings permits of shortening up the space that would be occupied by these several pairs of wheels, thus greatly reducing the cost of the power-house or structure in which the wheels are placed.

Heretofore for actuating the speed-gates of turbine wheels use has been made of racks and pinions situated on the inside of the water-wheel casing. These gears were thus placed out of sight in a place difficult of access, and, furthermore, are subject to very rapid wear because of the constant working in water which contains more or less grit. By the arrangement of the gate-operating mechanism herein shown and described all of said mechanism is placed on the outside, where it is not only accessible, but is in plain view of the operator, and its working parts instead of grinding in water can be operated in a bath of oil.

Having described my invention, I claim—

1. In a water-wheel, the combination with two or more water-wheels, and a sectional shaft upon which said wheels are mounted, of sleeve-couplings uniting said sections of the shaft and forming the journals thereof, bearings in which said journals run, the said bearings being inclosed in the wheel-casing and forming water-bearings between the wheels, substantially as described.

2. In a water-wheel, the combination with turbine wheels A and A', and a sectional shaft upon which said wheels are mounted, of a sleeve-coupling uniting said sections to form a continuous shaft, the said coupling consisting of two parts and forming the journal of said shaft, a bearing in which said journal runs, said bearing being inclosed in a casing, said casing being supported from the draft-chamber casing F, a shoe G, and provision carried by said shoe for supporting an end of the sectional shaft, substantially as described.

3. In a horizontal water-wheel, the combination with the wheel-casing, a flume-head cover, a sectional shaft, two or more wheels on said shaft, and cylinder-gates controlling said wheels, of longitudinally-movable rods connected to each side of said gates, racks connected to said rods and projected through the flume-head cover, and pinions mounted on said flume-head cover and engaging with said racks, and means for simultaneously actuating said pinions to move said rods, substantially as described.

4. In a horizontal water-wheel, the combination with the wheel-casing, a flume-head and cover to the latter of which the said casing is connected, of cylinder-gates, arms projecting from opposite sides of said gates, longitudinally-movable rods connected to said arms, racks and pinions mounted on the outside of the flume-head cover, and means for relieving said rods of the weight of the gates, substantially as described.

5. In a water-wheel system, the combination with a flume-head, and a flume-head cover, of dome-cylinders one of which is sustained by a rigid connection with said flume-head cover, chute-cases connected to said dome-cylinders, one or more draft-chamber casings, a sectional water-wheel shaft, and sleeve-couplings uniting the sections of said shaft and forming the journals thereof, substantially as specified.

In testimony that I claim the foregoing as my own I affix my signature in presence of two witnesses.

ALVA C. RICE.

Witnesses:
FRANK W. HOWELL,
R. J. McCARTY.